United States Patent
Madabhushi et al.

(10) Patent No.: US 10,956,795 B2
(45) Date of Patent: Mar. 23, 2021

(54) PREDICTING RECURRENCE IN EARLY STAGE NON-SMALL CELL LUNG CANCER (NSCLC) USING SPATIAL ARRANGEMENT OF CLUSTERS OF TUMOR INFILTRATING LYMPHOCYTES AND CANCER NUCLEI

(71) Applicant: Case Western Reserve University, Cleveland, OH (US)

(72) Inventors: Anant Madabhushi, Shaker Heights, OH (US); Xiangxue Wang, Cleveland Heights, OH (US); Vamsidhar Velcheti, Pepper Pike, OH (US)

(73) Assignees: Case Western Reserve University, Cleveland, OH (US); The Cleveland Clinic Foundation, Cleveland, OH (US)

( * ) Notice: Subject to any disclaimer, the term of this patent is extended or adjusted under 35 U.S.C. 154(b) by 120 days.

(21) Appl. No.: 16/111,542

(22) Filed: Aug. 24, 2018

(65) Prior Publication Data
US 2019/0087693 A1    Mar. 21, 2019

Related U.S. Application Data

(60) Provisional application No. 62/558,965, filed on Sep. 15, 2017.

(51) Int. Cl.
*G06K 9/62* (2006.01)
*G06T 7/00* (2017.01)
(Continued)

(52) U.S. Cl.
CPC ......... *G06K 9/6277* (2013.01); *G06K 9/0014* (2013.01); *G06K 9/00147* (2013.01);
(Continued)

(58) Field of Classification Search
CPC ........ G06K 9/627; G06K 9/66; G06K 9/6272; G06K 9/0014; G06K 9/00147;
(Continued)

(56) References Cited

U.S. PATENT DOCUMENTS

2010/0112592 A1* 5/2010 Wittliff ............... C12Q 1/6886
435/6.14
2016/0341731 A1* 11/2016 Sood ..................... G16B 40/00
(Continued)

*Primary Examiner* — Jaime M Holliday
(74) *Attorney, Agent, or Firm* — Eschweiler & Potashnik, LLC

(57) ABSTRACT

Embodiments predict early stage NSCLC recurrence, and include an image acquisition circuit configured to access an image of a region of tissue demonstrating early-stage NSCLC including a plurality of cellular nuclei; a nuclei detecting and segmentation circuit configured to detect a member of the plurality; and classify the member as a tumor infiltrating lymphocyte (TIL) nucleus or non-TIL nucleus; a spatial TIL feature circuit configured to extract spatial TIL features from the plurality, the spatial TIL features including a first subset of features based on the spatial arrangement of TIL nuclei, and a second subset of features based on the spatial relationship between TIL nuclei and non-TIL nuclei; and an NSCLC recurrence classification circuit configured to compute a probability that region will experience recurrence based on the spatial TIL features; and generate a classification of the region as likely or unlikely to experience recurrence based on the probability.

17 Claims, 9 Drawing Sheets

(51) Int. Cl.
*G06K 9/00* (2006.01)
*G06K 9/66* (2006.01)

(52) U.S. Cl.
CPC .............. *G06K 9/6272* (2013.01); *G06K 9/66* (2013.01); *G06T 7/0012* (2013.01); *G06T 2207/10056* (2013.01); *G06T 2207/20072* (2013.01); *G06T 2207/20081* (2013.01); *G06T 2207/20084* (2013.01); *G06T 2207/20152* (2013.01); *G06T 2207/30024* (2013.01); *G06T 2207/30061* (2013.01); *G06T 2207/30096* (2013.01)

(58) Field of Classification Search
CPC ......... G06T 7/0012; G06T 2207/20084; G06T 2207/20081; G06T 2207/20152; G06T 2207/20072; G06T 2207/30096; G06T 2207/30061; G06T 2207/30024; G06T 2207/10056
See application file for complete search history.

(56) References Cited

U.S. PATENT DOCUMENTS

| | | | | |
|---|---|---|---|---|
| 2016/0363593 | A1* | 12/2016 | Sebastiao | G01N 33/566 |
| 2017/0103521 | A1* | 4/2017 | Chukka | G06K 9/0014 |
| 2017/0365053 | A1* | 12/2017 | Yuan | G01N 33/57415 |
| 2019/0287240 | A1* | 9/2019 | Gaire | G16H 30/40 |

\* cited by examiner

US 10,956,795 B2

PREDICTING RECURRENCE IN EARLY STAGE NON-SMALL CELL LUNG CANCER (NSCLC) USING SPATIAL ARRANGEMENT OF CLUSTERS OF TUMOR INFILTRATING LYMPHOCYTES AND CANCER NUCLEI

CROSS REFERENCE TO RELATED APPLICATIONS

This application claims the benefit of U.S. Provisional Application 62/558,965 filed Sep. 15, 2017, which is incorporated herein in its entirety.

FEDERAL FUNDING NOTICE

This invention was made with government support under grants 1U24CA199374-01, R01 CA202752-01A1, R01 CA208236-01A1, R01 CA216579-01A1, R01 CA220581-01A1, and 1 C06 RR012463-01 awarded by the National Institutes of Health. Also with government support under grants W81XWH-13-1-0418, W81XWH-14-1-0323, and W81XWH-16-1-0329 awarded by the Department of Defense. The government has certain rights in the invention.

BACKGROUND

Early-stage (e.g., stages I and II) non-small cell lung cancer (NSCLC) accounts for approximately 80% of lung cancer. Early-stage NSCLC is typically treated with complete surgical excision. However, even after resecting the entire tumor mass, 30% to 55% of patients develop post-surgery recurrence within five years of surgery.

NSCLC histopathology is characterized by the interplay of tumor cells, immune cells (e.g., lymphocytes, plasma cells, macrophages, or granulocytes), fibroblasts, and pericytes/endothelial cells. The interaction of tumor cells with immune cells is associated with the likelihood of disease progression. Patient survival and treatment response, including chemotherapeutic response, is also associated with the density of tumor-infiltrating lymphocytes (TILs) in diverse solid tumor types.

However, existing approaches to estimating TIL density using hematoxylin and eosin (H&E) stained slides suffer from inter-reader variability. For example, inter-pathologist agreement is merely moderate (Kappa=0.59) in quantifying TILs on tissue slides, and guidelines for standardizing TIL grading are not widely adopted or implemented in lung cancer treatment. Thus, the use of TIL density as a prognostic marker for NSCLC has limited utility in clinical situations. Furthermore, existing approaches that quantify the extent of TILs on routine H&E pathology slide images focus on either counting individual TILs, or estimating TIL grade, which further limits the utility of such approaches.

BRIEF DESCRIPTION OF THE DRAWINGS

The accompanying drawings, which are incorporated in and constitute a part of the specification, illustrate various example operations, apparatus, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that, in some examples, one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
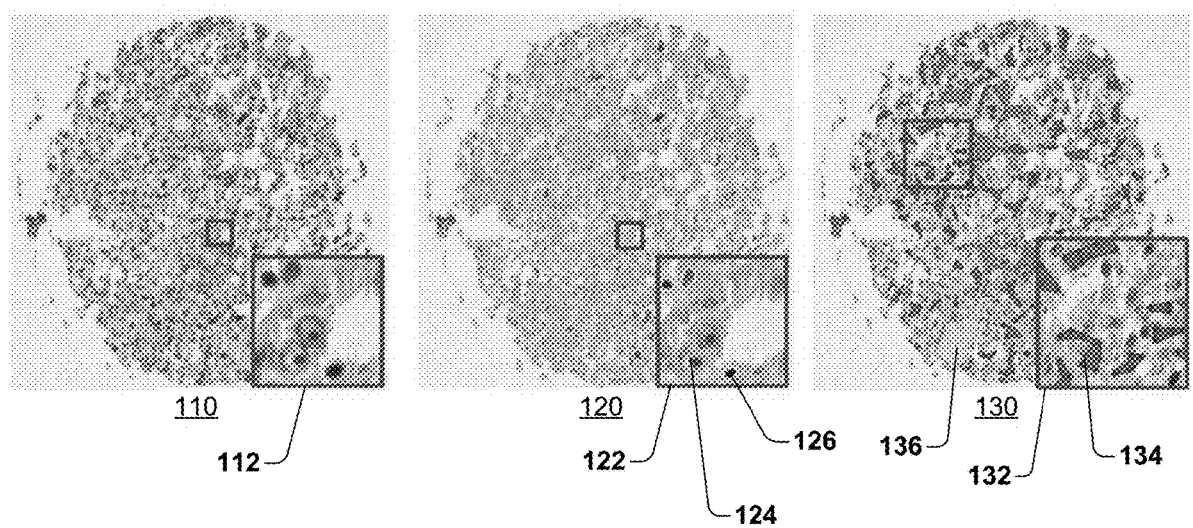
FIG. 1 illustrates representative tissue micro array (TMA) tissue spots of recurrent early-stage NSCLC.

The presence of a high degree of TILs in tissue demonstrating NSCLC is associated with better prognosis in NSCLC patients. However, existing approaches to estimating TIL density using H&E stained slides suffer from inter-reader variability, which limits the clinical utility of existing approaches. Embodiments described herein employ quantitative features related to the spatial architecture of TILs, the co-localization of TILs and cancer nuclei, and the density variation of TIL clusters, extracted from H&E images of tissue demonstrating early-stage NSCLC. Embodiments described herein employ quantitative features that are independently prognostic of disease recurrence, improving on existing clinicopathologic features.

Early-stage NSCLC is typically treated with complete surgical excision. However, even after resecting the entire tumor mass, 30-55% of patients develop disease recurrence within the first five years following surgery. Accurately and reproducibly identifying patients who are at a higher risk of recurrence would help in the selection of patients who may gain maximum benefit with further treatment including adjuvant chemotherapy following standard of care surgery.

NSCLC histopathology is characterized by a complex interplay of tumor cells, immune cells, including lymphocytes, plasma cells, macrophages, and granulocytes, fibroblasts, and pericytes/endothelial cells. The interaction of tumor cells with immune cells has a high association with likelihood of disease progression and influences tumor development, invasion, metastasis, and patient outcome. Patient survival and treatment response is also associated with an increased density of TILs in diverse solid tumor types. Additionally, increased TIL density is associated with better chemotherapeutic response.

Existing approaches to predicting recurrence suffer from substantial inter-reader variability in estimating TIL density using H&E stained slides. This has limited the routine use of TIL density as a metric clinically as a prognostic marker for NSCLC. For example, inter-pathologist agreement is at best moderate (Kappa=0.59) in quantifying TILs on tissue slides. While attempts have been made to establish guidelines for standardizing TIL grading in breast cancer, these efforts have been lagging in lung cancer, and are not widely implemented. Some existing approaches employ automated cell segmentation and detection algorithms for identifying and quantifying the extent of TILs from routine H&E pathology slide images. However, these approaches have primarily focused on either counting the individual TILs, or estimating the TIL grade, typically as being low, moderate, or high.

Some existing approaches consider spatial patterns of TILs and investigating their relationship with disease outcome. Multiplexed quantitative fluorescence (QIF) and immunohistochemistry (IHC) based methods have been employed for objectively identifying TIL subtypes and correlate the spatial arrangement and density of these TIL subtypes with overall survival (OS) in NSCLC. For instance, increased levels of cluster of differentiation (CD) 3 and CD8 TILs are significantly associated with improved 5-year OS. Similarly, the spatial interplay between tumor and regulatory T cells is associated with OS in NSCLC. Furthermore, the presence of CD8+ and forkhead box P3 (FOXP3+) TILs is correlated with the response of platinum-based neoadjuvant chemotherapy in advanced stage NSCLC.

Computer extracted features of spatial patterns and morphologic attributes of TILs from routine H&E slides may be prognostic. Graph network algorithms may be used to spatially characterize the arrangement of machine identified TILs in HER2+ breast cancer H&E images to predict TIL grade (i.e. high or low). Similarly, quantitative morphological features of nuclei and the surrounding cytoplasm may be extracted from H&E tissue images of early-stage NSCLC patients (e.g., area, shape, intensity, texture, density) for predicting survival. Deep learning models may be employed to identify patches of TILs in images, which are subsequently clustered using different similarity metrics. From such patch clusters, different indices may be computed (e.g., Ball and Hall, Banfield and Raftery, C, determinant ratio, etc.) which may be correlated with patient survival across different tumor types. However, these existing approaches only consider the spatial arrangement of TILs or the density of TILs, and are therefore sub-optimal.

Example embodiments generate cluster graphs of TIL nuclei and cluster graphs of non-TIL nuclei, and extract spatial TIL (SpaTIL) features relating to: 1) the spatial architecture of TIL clusters, 2) co-localization of clusters of both TILs and non-TIL cancer nuclei, and 3) variation in density of TIL clusters across the tissue slide image, based on the cluster graphs. Embodiments predict recurrence based, at least in part, on the association between disease recurrence and the SpaTIL features on patients with stage I and stage II NSCLC. Embodiments predict recurrence using SpaTIL features in patients with NSCLC with significantly greater accuracy and repeatability than the manual estimation of degree of TILs by thoracic pathologists, or by existing approaches that merely count TILs or attempt to grade TILs.

In one embodiment, TMAs were obtained from H&E-stained slides collated from three independent early-stage NSCLC cohorts, representing a total of n=301 patients. The three cohorts are represented by D1 (n=70), D2 (n=119), and D3 (n=112). A fourth dataset, named D4 (n=112), was also included, containing tissue cores corresponding to the same patients in D3 but extracted from different regions of the tumor. The corresponding clinicopathological and outcome information from patients in D1-D4 was obtained from retrospective chart review from the institutions at which the datasets were collated.

In this embodiment, patients from D1 and D2 comprised formalin-fixed paraffin-embedded (FFPE) tumor sections from previously reported retrospective collections of NSCLC patients. 0.6-mm cores from each tumor were then arrayed to make up the TMA. A further one-hundred and sixteen (116) patients provided two cores from the same tumor, to make up TMA datasets D3 and D4. TMA datasets D1 and D2 were scanned and digitized using an Aperio Scanscope CS whole slide imager at 20× magnification. TMA datasets D3 and D4 were scanned and digitized at 20× using a Ventana iScan HT Scanner. Finally, a 1500×1500 pixel image at 20× magnification was extracted and used to represent a unique tumor sample derived from each patient.

TMA dataset D1 was employed for feature discovery and model training. This dataset included samples from three-hundred and fifty (350) patients and was collected independently at two different institutions over ten years. TMA datasets D2 and D3 were used for independently validating the trained classifier. D2 comprised samples from two-hundred and two (202) patients and was collected at a third, different institution over fifteen years. TMA datasets D3 and D4 (D4 includes tissue cores corresponding to same patients in D3 but from a different portion of the tumor) comprised tissue images from one-hundred and eighty nine (189) patients and was collected at a fourth different institution over ten years. TMA datasets D3 and D4 were used to quantitatively test embodiments.

Embodiments automatically identify TILs and non-TIL nuclei in digitized H&E imagery. First, the spatial location of TILs and non-TIL nuclei on digitized H&E images is identified. A watershed-based technique is used for automatically detecting the nuclei. This technique applies a set of mathematical operations, including fast radial symmetry transform and regional minima, at different scales (e.g., 5×, 10× and 20×) to identify candidate locations for nuclei. This technique improves on those employed by existing approaches to segmenting nuclei by being computationally simpler and faster. This technique also facilitates the adjustment and fine-tuning of parameters with greater simplicity than techniques used by existing approaches, thereby improving the performance of computers, systems, or other apparatus on which embodiments are implemented.

Once nuclei represented in a digitized H&E image are detected, embodiments distinguish lymphocytes (i.e., TILs) from non-lymphocytes. TILs tend to be smaller compared to cancerous nuclei. TILs also tend to be more rounded and with a darker, more homogeneous staining than cancerous nuclei. Embodiments extract image derived features that relate to texture, shape, and color attributes of the segmented nuclei. These image derived features are provided to a machine learning classifier to classify the individual nuclei as corresponding either to TILs or non-TILs. The machine learning classifier may be, for example, a quadratic discriminant analysis (QDA) classifier, a linear discriminant analysis (LDA) classifier, a random forests classifier, or a convolutional neural network (CNN) classifier.

Embodiments quantitatively evaluate the spatial arrangement of TILs through the construction of spatial TIL graphs. A graph is a mathematical construct comprising of a finite sets of objects (nodes) that capture global and local relationships via pairwise connections (edges) between the nodes. Graphs may be used to quantitatively characterize nuclear architecture in histopathologic images by representing the nuclei as nodes and subsequently quantifying neighborhood relationships (e.g., proximity) and spatial arrangement between the nodes.

Embodiments identify sets of clusters of proximal TILs and non-TILs respectively to evaluate a spatial network of TILs and to extract the corresponding spatial TIL features. Embodiments represent centroids of each of, or a threshold number of, the individual TILs and non-TILs as nodes of a graph. Nodes are connected to others based on the weighted Euclidean norm where a weighting function favors the connectivity between proximal nodes. This results in multiple disconnected subgraphs or clusters of TILs being generated. This process is also repeated separately for all the non-TILs, or a threshold number of the non-TILs, represented in the image. The threshold number of non-TILs, or the threshold number of the individual TILs and non-TILs as nodes of a graph, may be selected based on a desired level of predictive accuracy, or on a desired use of computational resources, or on other criteria.

Embodiments extract two separate sets of spatial TIL features from the image. The first set includes twenty features related to spatial arrangement of TILs, extracted from the TIL cluster graphs. These features include first-order statistics (e.g. mean, mode, median) of the following representative descriptors: number of lymphocytes within the clusters, ratio between the area of the TIL clusters and area of the TMA spot, or ratio between the numbers of TILs within the cluster and the cluster area. The second set includes sixty-five features describing the relationship between TIL and non-TIL clusters extracted for each image. These include the ratio between the density (ratio between the number of nuclei within the cluster and the cluster area) of a non-TIL cluster and the density of its closest neighbor TIL cluster, the intersecting areas of the TIL and non-TIL clusters, or a value indicating if the nearest neighbor of a TIL cluster is either a TIL or a non-TIL cluster.

Embodiments select the most discriminative features from among the two separate sets of spatial TIL features. In one embodiment, minimum Redundancy Maximum Relevance (mRMR) feature selection is employed to identify the spatial TIL features that most correlated with recurrence in the discovery set D1. Selecting the spatial TIL features that most correlate with recurrence also eliminates features which are grossly similar to each other to prevent redundancy. In one embodiment, the most discriminative features include a mean number of lymphocyte clusters surrounding a non-lymphocyte cluster, a mode of the density of all lymphocyte clusters, a standard deviation of the area of non-lymphocyte clusters, and a mean of the area of non-lymphocyte clusters. The most discriminative features may also include the two nearest neighbor clusters to a non-lymphocyte cluster, median number of lymphocyte clusters. The most discriminative features may also include the two nearest neighbor clusters to a non-lymphocyte cluster, mean number of lymphocyte clusters. The most discriminative features may also include the three nearest neighbor clusters to a non-lymphocyte cluster, median number of lymphocyte clusters. The most discriminative features may also include the three nearest neighbor clusters to a non-lymphocyte cluster, mean number of lymphocyte clusters. The most discriminative features may also include the four nearest neighbor clusters to a non-lymphocyte cluster, mode of the number of lymphocyte clusters. The most discriminative features may also include the mean of the ratio of betweenness centralities of non-lymphocyte clusters to their closest lymphocyte cluster. The most discriminative features may further include the mean of the ratio of the closeness centralities of non-lymphocyte clusters to their closest lymphocyte cluster. In some embodiments described herein, density may be defined as the ratio of the number of cells within a cluster to the cluster pixel area. In some embodiments described herein, betweenness centrality is a measure of centrality in a graph based on the shortest paths. In some embodiments described herein, closeness centrality is a measure of centrality calculated as the sum of the length of the shorted paths between a node and all other nodes in the graph.

Embodiments employ a machine learning classifier to compute a probability that the region of tissue will experience recurrence or non-recurrence. In one embodiment, a QDA classifier is trained using the top spatial TIL features (QS) identified from D1 to separate the patients into two classes: recurrence and non-recurrence. Embodiments the employ a QDA classifier improve on existing approaches because no hyper parameters are required to tune the QDA classifier, and it is able to learn quadratic boundaries. Therefore embodiments are more flexible compared to existing approaches that employ linear classifiers.

Additionally, another QDA classifier was trained using TIL-density-based (DenTIL) features (QD) on the training set D1. The DenTIL features include a ratio between the number of TILs and the TMA spot area, a ratio between the total regions of the TMA spot covered by TILS to the total area of the corresponding TMA spot, a ratio between the number of TILs and the number of non-TILs within a TMA spot, and a grouping value indicating how close the TILs are to each other. The grouping value indicating how close the TILs are to each other is computed as the sum of the inverse distances between TILs.

Following parameter optimization (e.g., mRMR feature selection), the QDA classifier was locked down using D1. The performance of the locked down QDA classifiers QS and QD in distinguishing between early stage NSCLC patients who did and did not have recurrence was evaluated on the independent validation sets D2, D3, and D4. Classifiers QS and QD assigned a probability of recurrence to each image in the test sets. Classifier performance was evaluated via the concordance statistic or Cindex. The recurrence and non-recurrence labels predicted by QS and QD were compared with the ground truth labels (true patient outcomes) to determine classifier accuracy and C-index. The C-index obtained for QS on D3 and D4 were quantitatively compared to evaluate the effect of spatial tissue sampling on the classifier performance.

Embodiments measurably improve on existing approaches to predicting recurrence in early stage NSCLC on digitized images of H&E tissue samples. On two TMA datasets comprising of 119 and 112 patients, the spatial TIL classifier yielded CIs of 0.73, and 0.70, respectively. A Kaplan-Meier analysis utilizing the log-rank test showed a strong association between the predictions of the spatial TIL classifier and recurrence for D2 ($p=5.0 \times 10$-4), D3 ($p=1.0 \times 10$-3), and D4 ($p=0.01$). Likewise, a multivariate Cox proportional survival analysis revealed a HR of 3.08 (95% confidence interval: 2.1-4.5, $p=7.3 \times 10$-5). Notably, the cohorts were obtained from different institutions with local and variable tissue processing and preservation protocols. In addition, slides were stained in different institutions and digitalized with two different instruments. This reflects the robustness, and the relative resilience to image and color variance on account of major pre-analytical variables and with samples from multiple different sites and institutions, of embodiments described herein.

Embodiments provide improved accuracy and speed compared to human pathologists. A Kaplan-Meier analysis was conducted for each of two human pathologists, and results showed that no significant statistical correlation was found between human Pathologist 1 and prognosis for any dataset ($p>0.05$) while there was a significant statistical correlation between TIL grade estimation of human Pathologist 2 and patient outcome for D1 ($p=6.0 \times 10-3$). In addition, the agreement among expert pathologists for D1 and D2 was found to be moderate (K=0.50) and comparable to values previously reported for NSCLC (K=0.59) and breast pathology (K=0.72). This moderate agreement might be due to the fact that TIL grading in lung pathology lacks a standardized scoring system, hence each pathologist might preferentially focus on different areas of the tissue during examination (e.g., epithelium or stroma) or consider different cell populations within the "TIL" infiltration (e.g., mononuclear cells beyond lymphocytes such as plasmocytes and myeloid cells). Finally, different pathologists may have variable expertise evaluating immune cell infiltrates or natural individual variation in their perception of colors, shapes, and relative amounts/proportions. In contrast, the results obtained by embodiments described herein using spatial TIL features are objectively measured and indicate that the spatial arrangement of TILs and tumor cells is strongly associated with recurrence in early stage NSCLC ($p<0.05$).

FIG. 1 illustrates representative TMA spots of recurrent early-stage NSCLC. An original H&E stained image 110 is illustrated. A magnified section 112 of original H&E stained image 110 is also illustrated. At 120, the same region of tissue as illustrated by original H&E stained image 110 is illustrated with TIL nuclei 124 and non-TIL nuclei 126 illustrated in magnified section 122. At 130, the qualitative representation of a variation in the density of lymphocyte clusters spatial TIL feature is overlaid onto the same region of tissue as illustrated by original H&E stained image 110. A magnified section 132 includes a low density of lymphocyte clusters spatial TIL region 134. A high density of lymphocyte clusters spatial TIL region 136 is also illustrated.

Figure 2:
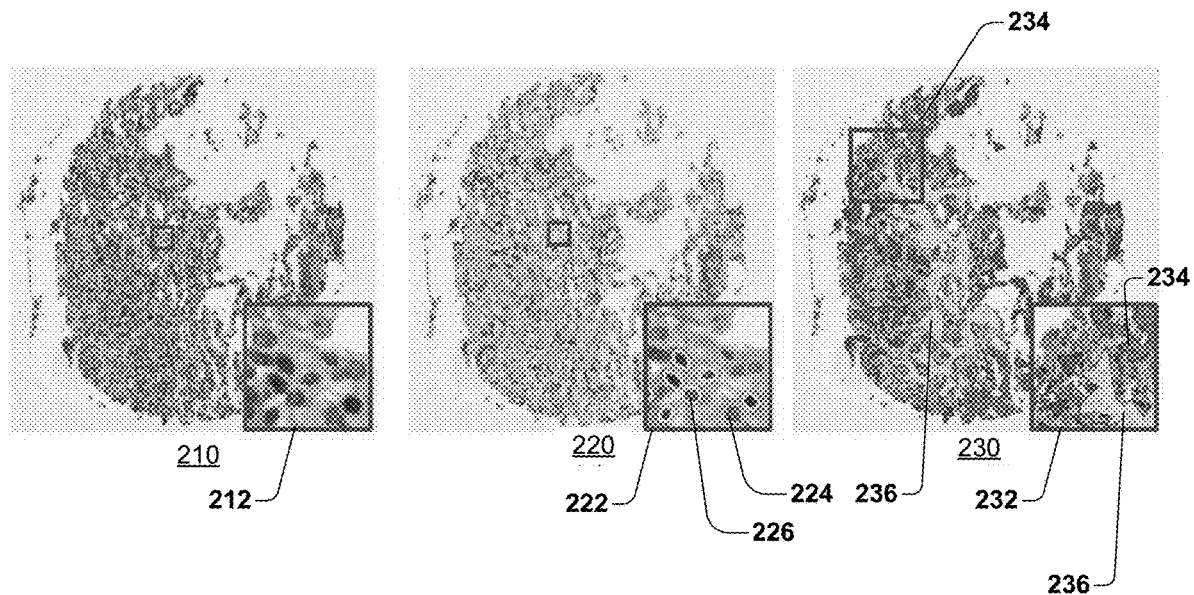
FIG. 2 illustrates representative TMA tissue spots of non-recurrent early-stage NSCLC

FIG. 2 illustrates representative TMA spots of non-recurrent early-stage NSCLC. An original H&E stained image 210 is illustrated. A magnified section 212 of original H&E stained image 210 is further illustrated. At 220, the same region of tissue as illustrated by original H&E stained image 210 is illustrated with TIL nuclei 226 and non-TIL nuclei 224 illustrated in magnified section 222. At 230, the qualitative representation of a variation in the density of lymphocyte clusters spatial TIL feature is overlaid onto the same region of tissue as illustrated by original H&E stained image 210. A low density of lymphocyte clusters spatial TIL region 234 is illustrated. A high density of lymphocyte clusters spatial TIL region 236 is also illustrated. A magnified section 232 includes another low density of lymphocyte clusters spatial TIL region 234, and another high density of lymphocyte clusters spatial TIL region 236. Note that non-recurrence cases are characterized by the presence of more high-density clusters, while recurrence cases include a larger number of low-density clusters.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, circuit, processor, or similar electronic device that manipulates and transforms data represented as physical (electronic) quantities.

Example methods and operations may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 3:
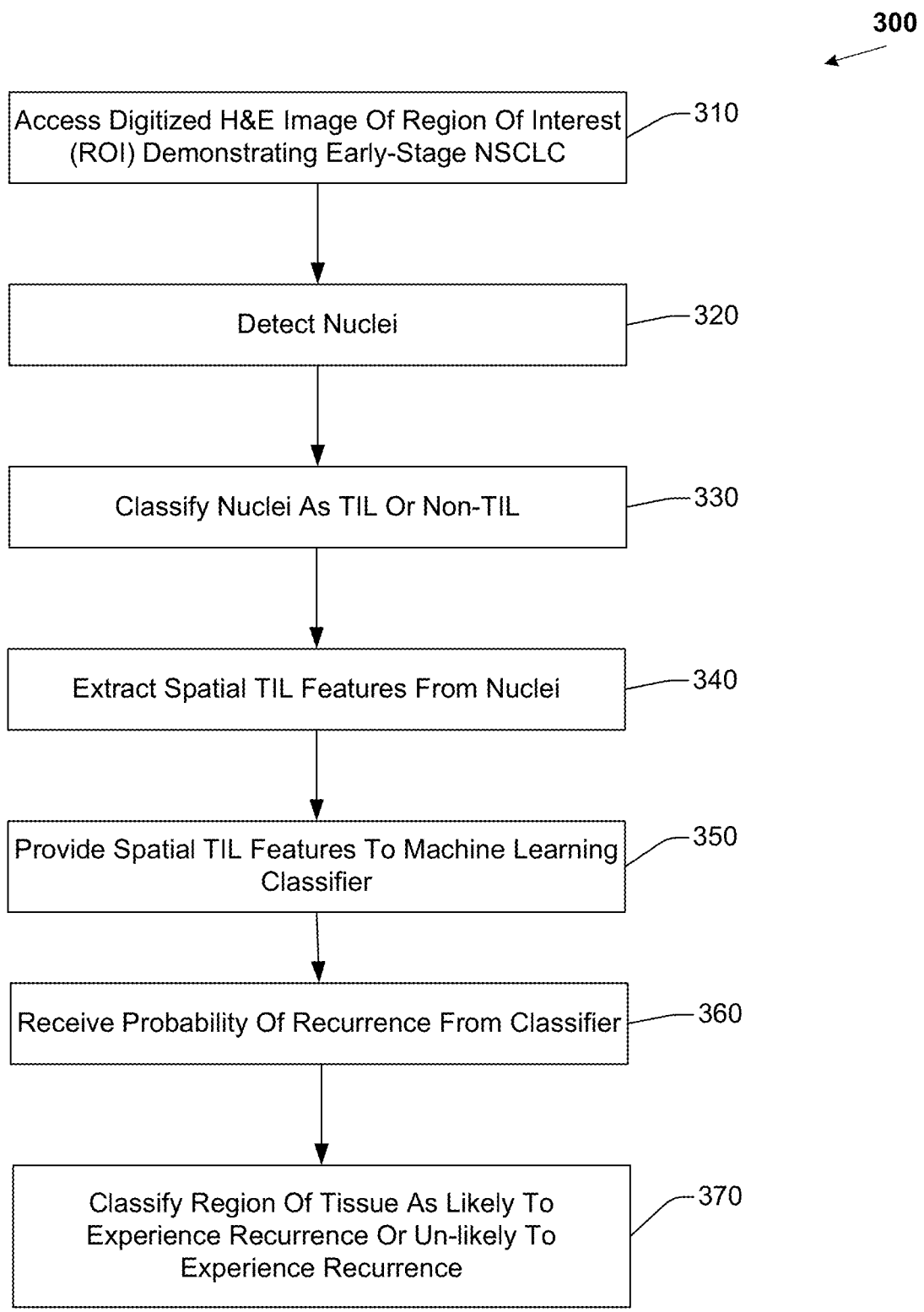
FIG. 3 is a flow diagram of example operations for predicting recurrence of early-stage NSCLC.

FIG. 3 is a flow diagram of example operations 300 that may be performed by a processor for predicting early-stage NSCLC recurrence. A processor(s) may include any combination of general-purpose processors and dedicated processors (e.g., graphics processors, application processors, etc.). The processors may be coupled with or may include memory or storage and may be configured to execute instructions stored in the memory or storage to enable various apparatus, applications, or operating systems to perform the operations. The memory or storage devices may include main memory, disk storage, or any suitable combination thereof. The memory or storage devices may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, or solid-state storage.

The set of operations 300 includes, at 310, accessing an image of a region of tissue. The region of tissue may include lung tissue. The image may be a digitized image of a region of tissue demonstrating early-stage NSCLC. The region of tissue includes a plurality of cellular nuclei, and the image includes a representation of the plurality of cellular nuclei. Accessing the image includes acquiring electronic data, reading from a computer file, receiving a computer file, reading from a computer memory, or other computerized activity. A member of the set of images has a plurality of pixels, a pixel having an intensity. In one embodiment, the image is a 1500 pixel by 1500 pixel digitized H&E stained image scanned at 20× magnification. In another embodiment, the image may be acquired using other, different imaging parameters, including different sizes, staining techniques, or scanning magnification levels.

The set of operations 300 also includes, at 320 detecting a member of the plurality of cellular nuclei represented in the image. In one embodiment, detecting a member of the plurality of cellular nuclei represented in the image includes detecting the member of the plurality of cellular nuclei represented in the image using a watershed segmentation technique. The watershed segmentation technique includes applying, at a plurality of scales, a fast radial symmetry transform and regional minima to the image. A scale may be, for example 5×, 10× or 20×. In another embodiment, another, different automated segmentation technique may be employed. For example, a deep learning based neural network may be employed to delineate the nuclei boundary based on a large number of training exemplars.

The set of operations 300 also includes, at 330, classifying the member of the plurality of cellular nuclei as a TIL nucleus or non-TIL nucleus. In one embodiment, classifying the member of the plurality of nuclei as a TIL nucleus or non-TIL nucleus includes extracting a set of image features from the member of the plurality of cellular nuclei. In this embodiment, the set of image features includes a texture feature, a shape feature, and a color feature. In another embodiment, the set of image features may include other, different features. Classifying the member of the plurality of nuclei as a TIL nucleus or non-TIL nucleus is based on the set of image features. Classifying the member of the plurality of nuclei as a TIL nucleus or non-TIL nucleus includes acquiring electronic data, reading from a computer file, receiving a computer file, reading from a computer memory, or other computerized activity.

The set of operations 300 also includes, at 340, extracting a set of spatial TIL features from the plurality of cellular nuclei. The set of spatial TIL features includes a first subset of features based on the spatial arrangement of TIL nuclei represented in the image. The set of spatial TIL features also includes a second subset of features based on the spatial relationship between TIL nuclei and non-TIL nuclei represented in the image.

In one embodiment, generating the first subset of features includes generating a TIL cluster graph. A node of the TIL cluster graph is a centroid of a TIL-nucleus. The probability that a first centroid of a first TIL-nucleus will be connected with a second, different centroid of a second, different TIL-nucleus is based on a weighted Euclidean norm of the Euclidean distance between the first centroid and the second centroid. Generating the first subset further includes computing a first set of spatial TIL features based on the TIL cluster graph.

In one embodiment, the first set of spatial TIL features includes the mean of the number of TILs in the TIL cluster graph, the mean of the ratio of the area of the TIL cluster graph and the area of the region of tissue represented in the image, and the mean of the ratio of the number of TILs within the TIL cluster graph and the area of the TIL cluster graph. In this embodiment, the first set of spatial TIL features also includes the mode of the number of TILs in the TIL cluster graph, the mode of the ratio of the area of the TIL cluster graph and the area of the region of tissue represented in the image, and the mode of the ratio of the number of TILs within the TIL cluster graph and the area of the TIL cluster graph. In this embodiment, the first set of spatial TIL features further includes the median of the number of TILs in the TIL cluster graph, the median of the ratio of the area of the TIL cluster graph and the area of the region of tissue represented in the image, and the median of the ratio of the number of TILs within the TIL cluster graph and the area of the TIL cluster graph. In another embodiment, the first set of spatial TIL features may include other, different features extracted from the TIL cluster graph.

In one embodiment, generating the second subset of features includes generating a non-TIL cluster graph. A node of the non-TIL cluster graph is a centroid of a non-TIL-nucleus. The probability that a first centroid of a first non-TIL nucleus will be connected with a second, different centroid of a second, different non-TIL nucleus is based on a weighted Euclidean norm of the Euclidean distance between the first non-TIL centroid and the second, different non-TIL centroid. Generating the second subset of features further includes computing a second set of spatial TIL features based on the non-TIL cluster graph and the TIL cluster graph, where the second set of spatial TIL features describes a statistical relationship between the non-TIL cluster graph and the TIL cluster graph.

In one embodiment, the second set of spatial TIL features includes a ratio between the density of a non-TIL cluster graph and the density of the TIL cluster graph nearest the non-TIL cluster graph. In this embodiment, the second set of spatial TIL features also includes the value of an intersecting area of a non-TIL cluster graph and a TIL cluster graph. In this embodiment, the second set of spatial TIL features further includes a value indicating if the nearest neighbor cluster graph of a TIL cluster graph is a non-TIL cluster graph or a TIL cluster graph. In another embodiment, the second set of spatial TIL features may include other, different features extracted from the non-TIL cluster graph, or from the spatial relationship of the non-TIL cluster graph with the TIL cluster graph.

The set of operations 300 also includes, at 350, providing the set of spatial TIL features to a machine learning classifier. Providing the set of spatial TIL features to the machine learning classifier includes acquiring electronic data, reading from a computer file, receiving a computer file, reading from a computer memory, or other computerized activity. In one embodiment, the machine learning classifier is a QDA classifier. The QDA classifier is trained on a set of training images. In one embodiment, a member of the set of training images is acquired using different imaging parameters than the digitized image. For example, the digitized image may be a 1500 pixel by 1500 pixel digitized H&E stained image scanned at 20× magnification, while the member of the training set of images may a 2000 pixel by 2000 pixel digitized H&E stained image scanned at 30× magnification. In other embodiments, other types of machine learning classifiers, or imaging parameters may be employed.

The set of operations 300 also includes, at 360, receiving, from the machine learning classifier, a probability that region of tissue will experience recurrence. Receiving the probability from the machine learning classifier includes acquiring electronic data, reading from a computer file, receiving a computer file, reading from a computer memory, or other computerized activity. The machine learning classifier computes the probability based, at least in part, on the set of spatial TIL features.

The set of operations 300 further includes, at 370, classifying the region of tissue as likely to experience recurrence or unlikely to experience recurrence. The classification of the region of tissue is based, at least in part, on the probability. The classification of the region of tissue may be further based on the image, or on the set of spatial TIL features.

Figure 4:
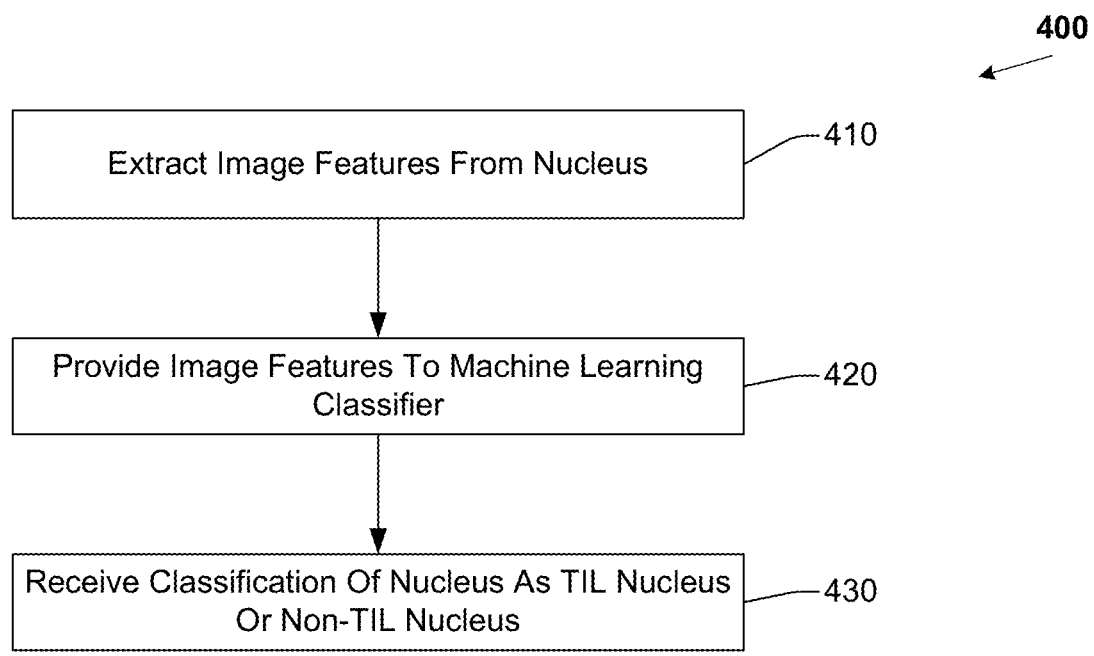
FIG. 4 is a flow diagram of example operations for classifying a cellular nucleus as a TIL nucleus or non-TIL nucleus.

In one embodiment, classifying the member of the plurality of nuclei as a TIL nucleus or non-TIL nucleus also includes providing the set of image features to a second, different, machine learning classifier. FIG. 4 is a flow diagram of example operations 400, for classifying the member of the plurality of nuclei as a TIL nucleus or non-TIL nucleus. In this example, the set of operations 400 includes, at 410, extracting a set of image features from the member of the plurality of nuclei. In this embodiment, the set of image features includes a texture feature, a shape feature, and a color feature. In another embodiment, the set of image features may include other, different features. The set of operations also includes, at 420, providing the set of image features to a second machine learning classifier. The second machine learning classifier may be a QDA classifier, an LDA classifier, a random forests classifier, or may be a deep learning classifier, including a CNN. The set of operations further includes, at 430, receiving, from the second machine learning classifier, a classification of the member of the plurality of cellular nuclei as a TIL nucleus or non-TIL nucleus. The second machine learning classifier classifies the member of the plurality of cellular nuclei based on the set of image features. Classifying the member of the plurality of nuclei as a TIL nucleus or non-TIL nucleus includes acquiring electronic data, reading from a computer file, receiving a computer file, reading from a computer memory, or other computerized activity.

In one embodiment, the set of operations 300 further includes controlling a processor or a personalized NSCLC treatment plan system to generate a personalized treatment plan. The personalized treatment plan is based, at least in part, on the classification. In one embodiment, the personalized treatment plan is further based on the images, or the set of spatial TIL features. Generating a personalized treatment plan facilitates delivering a particular treatment that will be therapeutically active to the patient, while minimizing negative or adverse effects experienced by the patient. For example, the personalized treatment plan may suggest a surgical treatment, may define an immunotherapy agent dosage or schedule, or a chemotherapy agent dosage or schedule, when the region of tissue is classified as likely to experience recurrence. For a region of tissue classified as unlikely to experience recurrence, other treatments may be suggested.

In one embodiment, the operations 300 further include training the machine learning classifier. In this embodiment, the machine learning classifier is trained and tested using a training set of images and a testing set of images. Training the machine learning classifier may include training the machine learning classifier until a threshold level of accuracy is achieved, until a threshold time has been spent training the machine learning classifier, until a threshold amount of computational resources have been expended training the machine learning classifier, or until a user terminates training. Other training termination conditions may be employed. Training the machine learning classifier may also include determining which spatial TIL features are most discriminative in distinguishing tissue likely to experience recurrence from tissue unlikely to experience recurrence.

While FIG. 3 illustrates various actions occurring in serial, it is to be appreciated that various actions illustrated in FIG. 3 could occur substantially in parallel. By way of illustration, a first process could involve detecting a member of the plurality of cellular nuclei, a second process could involve classifying a member of the plurality of cellular nuclei as a TIL or non-TIL nucleus, and a third process could involve classifying a region of interest. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage device may store computer executable instructions that if executed by a machine (e.g., computer, processor) cause the machine to perform methods or operations described or claimed herein including methods or operations 300. While executable instructions associated with the listed methods are described as being stored on a computer-readable storage device, it is to be appreciated that executable instructions associated with other example methods or operations described or claimed herein may also be stored on a computer-readable storage device. In different embodiments the example methods or operations described herein may be triggered in different ways. In one embodiment, a method or operation may be triggered manually by a user. In another example, a method or operation may be triggered automatically.

Improved classification of tissue demonstrating early-stage NSCLC may produce the technical effect of improving treatment efficacy by increasing the accuracy of and decreasing the time required to treat patients demonstrating early-stage NSCLC, or other forms of cancerous pathology. Treatments and resources, including expensive immunotherapy agents or chemotherapy may be more accurately tailored to patients with a likelihood of benefiting from said treatments and resources, including responding to immunotherapy or chemotherapy, so that more appropriate treatment protocols may be employed, and expensive resources are not wasted. Controlling a personalized medicine system, a computer assisted diagnosis (CADx) system, a processor, or NSCLC recurrence prediction system based on improved, more accurate identification or classification of tissue further improves the operation of the system, processor, or apparatus, since the accuracy of the system, processor, or apparatus is increased and unnecessary operations will not be performed. Embodiments described herein, including at least the sets of operations 300 and 400, apparatus 500 and 600, and methods 800 and 900, resolve features extracted from digitized H&E stained images at a higher order or higher level than a human can resolve in the human mind or with pencil and paper. For example, the spatial TIL features are not biological properties of cancerous tissue that a human eye can perceive. A tumor does not include a set of cluster graphs, and these features cannot be stored in a human mind. Embodiments described herein use a combined order of specific rules, elements, operations, or components that render information into a specific format that is then used and applied to create desired results more accurately, more consistently, and with greater reliability than existing approaches, thereby improving the performance of the computer or system with which embodiments are implemented.

Using a more appropriately modulated treatment may lead to less aggressive therapeutics being required for a patient or may lead to avoiding or delaying a biopsy, a resection, or other invasive procedure. When patients demonstrating early-stage NSCLC who are likely to experience recurrence are more accurately distinguished from patients who are unlikely to experience recurrence, patients most at risk may receive a higher proportion of scarce resources (e.g., therapeutics, physician time and attention, hospital beds) while those less likely to benefit from the treatment, or less in need, may be spared unnecessary treatment, which in turn spares unnecessary expenditures and resource consumption. Example methods, apparatus, and other embodiments may thus have the additional effect of improving patient outcomes compared to existing approaches.

Figure 5:
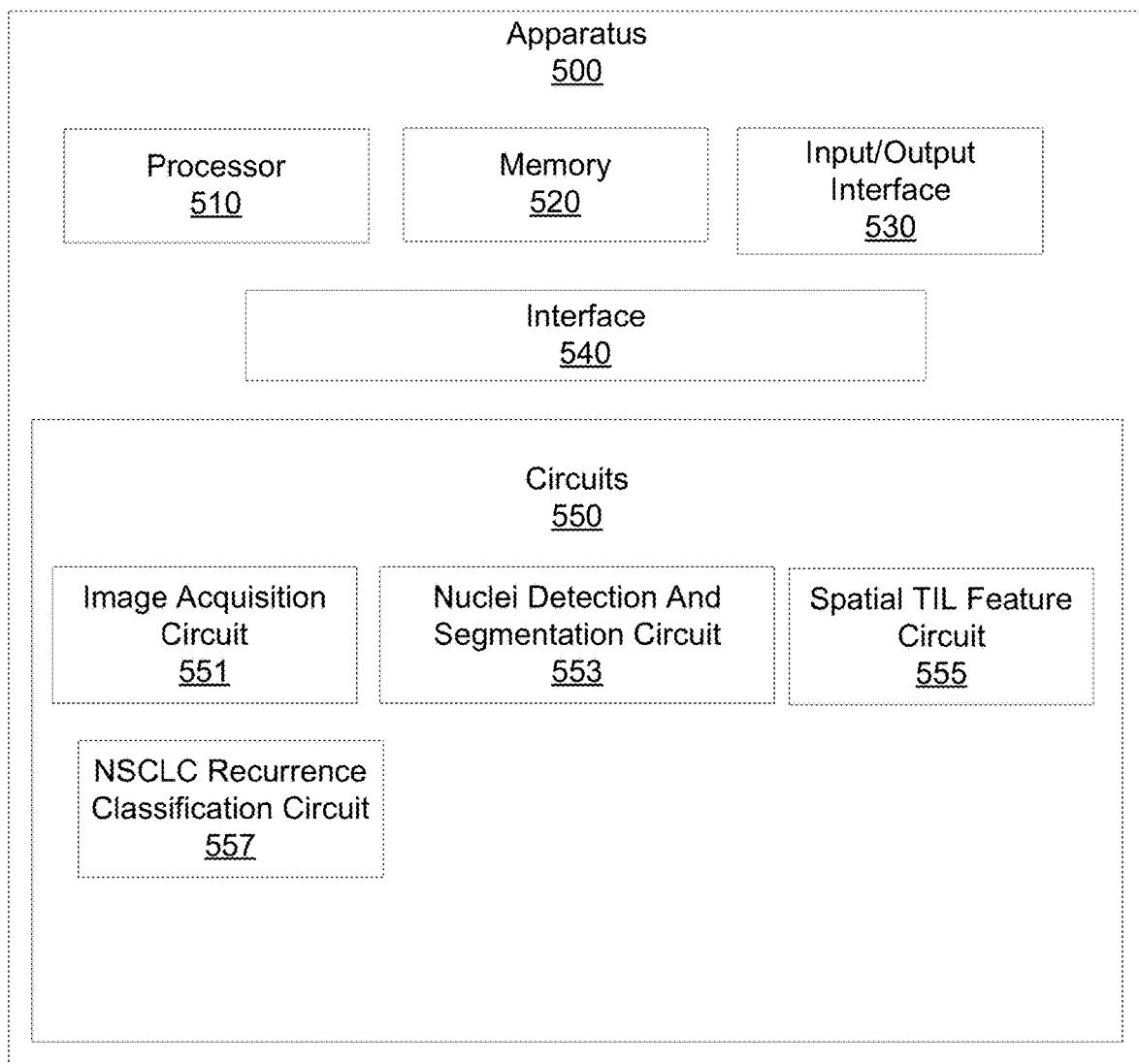
FIG. 5 illustrates an example apparatus for predicting recurrence of early-stage NSCLC.

FIG. 5 illustrates an example apparatus 500 for predicting recurrence of early-stage NSCLC. Apparatus 500 includes a processor 510. Apparatus 500 also includes a memory 520. Processor 510 may, in one embodiment, include circuitry such as, but not limited to, one or more single-core or multi-core processors. Processor 510 may include any combination of general-purpose processors and dedicated processors (e.g., graphics processors, application processors, etc.). The processors may be coupled with or may include memory (e.g. memory 520) or storage and may be configured to execute instructions stored in the memory or storage to enable various apparatus, applications, or operating systems to perform the operations. Memory 520 is configured to store a digitized image of an H&E stained slide of a region of tissue demonstrating early-stage NSCLC. The digitized image has a plurality of pixels, a pixel having an intensity. Memory 520 may be further configured to store a training set of digitized images of H&E stained slides of early-stage NSCLC.

Apparatus 500 also includes an input/output (I/O) interface 530, a set of circuits 550, and an interface 540 that connects the processor 510, the memory 520, the I/O interface 530, and the set of circuits 550. I/O interface 530 may be configured to transfer data between memory 520, processor 510, circuits 550, and external devices, for example, a CADx system or a personalized medicine system.

The set of circuits 550 includes an image acquisition circuit 551, a nuclei detection and segmentation circuit 553, a spatial TIL feature circuit 555, and an NSCLC recurrence classification circuit 557.

Image acquisition circuit 551 is configured to access a diagnostic image of a region of tissue demonstrating early-stage NCSLS. The region of tissue represented in the diagnostic image includes a plurality of cellular nuclei. Accessing the diagnostic image may include accessing a digitized image of an H&E stained slide of a region of tissue demonstrating early-stage NSCLC stored in memory 520. Accessing the diagnostic image includes acquiring electronic data, reading from a computer file, receiving a computer file, reading from a computer memory, or other computerized activity.

Nuclei detection and segmentation circuit 553 is configured to detect a member of the plurality of cellular nuclei represented in the diagnostic image. Nuclei detection and segmentation circuit 553 is also configured to classify the member of the plurality of cellular nuclei represented in the diagnostic image as a TIL nucleus or as a non-TIL nucleus. In one embodiment, nuclei detecting and segmentation circuit 553 is configured to detect the member of the plurality of cellular nuclei represented in the diagnostic image using a watershed segmentation technique. The watershed segmentation technique includes applying, at a plurality of scales, a fast radial symmetry transform and regional minima to the diagnostic image. In one embodiment, the plurality of scales may include 5×, 10×, or 20× scales. In another embodiment, nuclei detecting and segmentation circuit 553 may be configured to employ other automated segmentation techniques.

Spatial TIL feature circuit 555 is configured to extract a set of spatial TIL features from the plurality of cellular nuclei represented in the diagnostic image. The set of spatial TIL features includes a first subset of features based on the spatial arrangement of TIL nuclei represented in the diagnostic image. The set of spatial TIL features also includes a second subset of features based on the spatial relationship between TIL nuclei and non-TIL nuclei represented in the diagnostic image.

In one embodiment, spatial TIL feature circuit 555 is configured to generate the first subset of features by generating at least one TIL cluster graph. A node of a TIL cluster graph is a centroid of a TIL-nucleus. The probability that a first centroid of a first TIL-nucleus will be connected with a second, different centroid of a second, different TIL-nucleus is based on a weighted Euclidean norm of the Euclidean distance between the first centroid of the first TIL-nucleus and the second centroid of the second, different TIL-nucleus.

In this embodiment, spatial TIL feature circuit 555 is further configured to compute a first set of spatial TIL features based on the TIL cluster graph.

In one embodiment, spatial TIL feature circuit 555 is configured to generate the second subset of features by generating a non-TIL cluster graph. A node of the non-TIL cluster graph is a centroid of a non-TIL nucleus. The probability that a first centroid of a first, non-TIL nucleus will be connected with a second, different centroid of a second, different non-TIL nucleus is based on a weighted Euclidean norm of the Euclidean distance between the first centroid of the first non-TIL nucleus and the second centroid of the second, different non-TIL nucleus. In this embodiment, spatial TIL feature circuit 555 is also configured to compute a second set of spatial TIL features based on the non-TIL cluster graph and the TIL cluster graph. The second set of spatial TIL features describes a statistical relationship between the non-TIL cluster graph and the TIL cluster graph.

NSCLC recurrence classification circuit 557 is configured to compute a probability that region of tissue will experience recurrence. NSCLC recurrence classification circuit 557 computes the probability based, at least in part, on the set of spatial TIL features. NSCLC recurrence classification circuit 557 is also configured to generate a classification of the region of tissue as likely to experience recurrence or unlikely to experience recurrence based, at least in part, on the probability.

In one embodiment, NSCLC recurrence classification circuit 557 includes a machine learning classifier configured to compute the probability based, at least in part, on the set of spatial TIL features. The machine learning classifier may employ a QDA classification approach. In this embodiment, the machine learning classifier is trained on a set of training images. In one embodiment, a member of the set of training images is acquired using different imaging parameters than the diagnostic image. In another embodiment, NSCLC recurrence classification circuit 557 may be configured as another type of machine learning or deep learning classifier, including as an LDA classifier, an RF classifier, or a CNN classifier.

Figure 6:
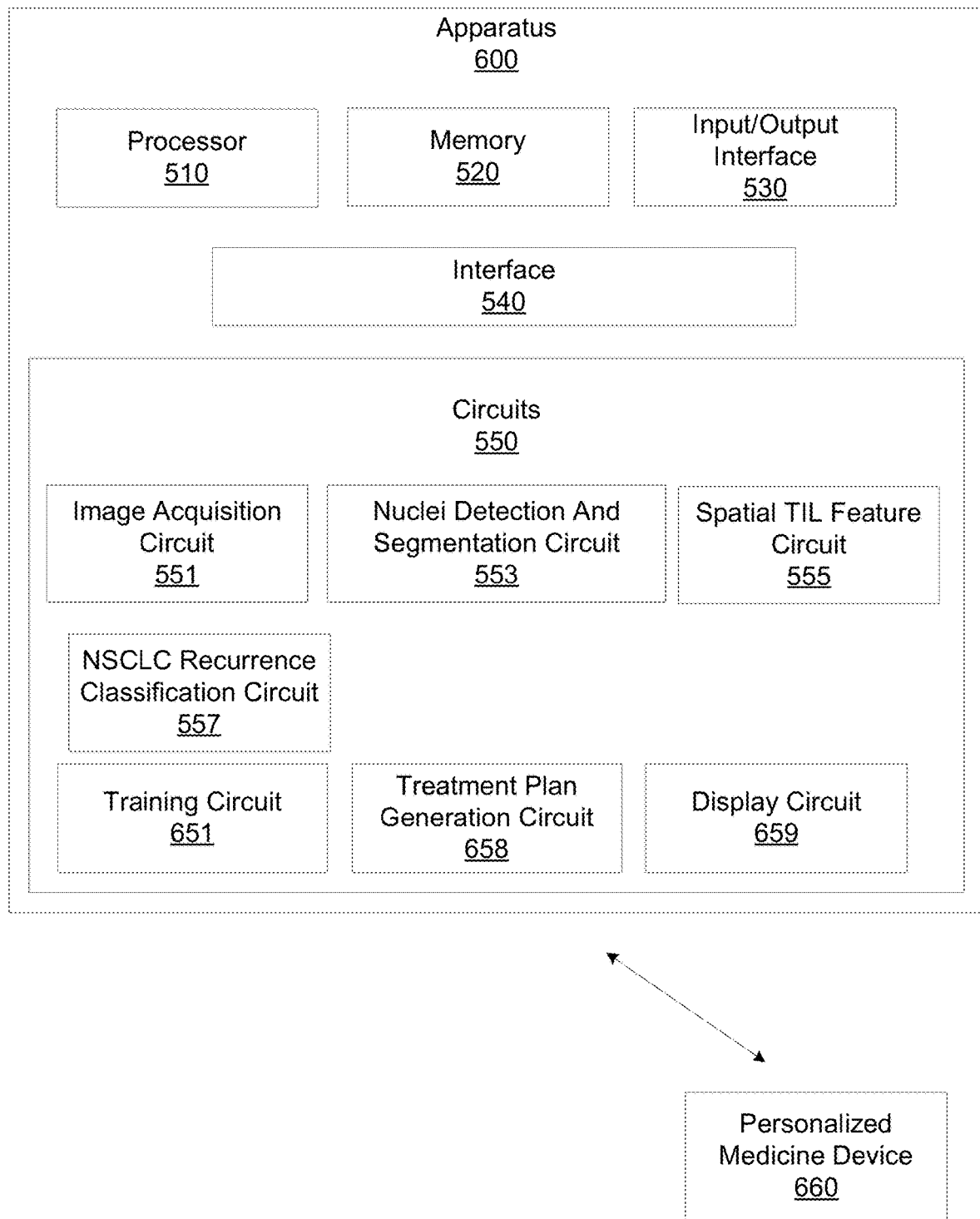
FIG. 6 illustrates an example apparatus for predicting recurrence of early-stage NSCLC.

FIG. 6 illustrates an apparatus 600 that is similar to apparatus 500 but that includes additional elements and details. Apparatus 600 includes a treatment plan generation circuit 658. Treatment plan generation circuit 658 is configured to generate a personalized treatment plan based, at least in part, on the classification. In one embodiment, the personalized treatment plan is further based on the diagnostic image, or the set of spatial TIL features. The personalized treatment plan may suggest a surgical treatment, may define an immunotherapy agent dosage or schedule, or a chemotherapy agent dosage or schedule, when the region of tissue is classified as likely to experience recurrence. For a region of tissue classified as unlikely to experience recurrence, other treatments, schedules, or dosages may be suggested.

Apparatus 600 also includes a display circuit 659. Display circuit 659 is configured to display the classification, the probability, the personalized treatment plan, the set of spatial TIL features, or the diagnostic image. In one embodiment, display circuit 659 is configured to display the classification, the probability, the personalized treatment plan, the set of spatial TIL features, or the diagnostic image on a computer monitor, a smartphone display, a tablet display, or other displays. Displaying the classification, the probability, the personalized treatment plan, the set of spatial TIL features, or the diagnostic image may also include printing the classification, the probability, the personalized treatment plan, the set of spatial TIL features, or the diagnostic image.

Display circuit 659 may also control a CADx system, a monitor, or other display, to display operating parameters or characteristics of image acquisition circuit 551, nuclei detecting and segmentation circuit 553, spatial TIL feature circuit 555, or NSCLC recurrence classification circuit 557, including a machine learning classifier, during both training and testing, or during clinical operation of apparatus 500 or apparatus 600.

In one embodiment, apparatus 600 also includes training circuit 651. Training circuit 651 is configured to train NSCLC recurrence classification circuit 557 according to techniques described herein. Training NSCLC recurrence classification circuit 557 may include training a machine learning classifier, including a QDA classifier. In one embodiment, training circuit 651 is configured to access a training dataset of digitized images of a region of interest demonstrating early-stage NSCLC. The training dataset includes images of tissue that experience recurrence, and images of tissue that did not experience recurrence. Training circuit 651 may be further configured to access a testing dataset of digitized images of a region of interest demonstrating early-stage NSCLC, where the testing dataset includes images of tissue that experience recurrence, and images of tissue that did not experience recurrence. In this embodiment, the machine learning classifier is trained and tested using the training dataset of images and the testing dataset of images. Training the machine learning classifier may include training the machine learning classifier until a threshold level of accuracy is achieved, until a threshold time has been spent training the machine learning classifier, until a threshold amount of computational resources have been expended training the machine learning classifier, or until a user terminates training. Other training termination conditions may be employed.

FIG. 6 further illustrates a personalized medicine device 660. Apparatus 600 may be configured to transmit the classification, the probability, the personalized treatment plan, the set of spatial TIL features, or the diagnostic image to the personalized medicine device 660. Personalized medicine device 660 may be, for example, a CADx system, an early-stage NSCLC recurrence prediction system, or other type of personalized medicine device that may be used to facilitate the classification of tissue. In one embodiment, treatment plan generation circuit 658 may control personalized medicine device 660 to display the classification, the probability, the personalized treatment plan, the set of spatial TIL features, or the diagnostic image on a computer monitor, a smartphone display, a tablet display, or other displays.

Figure 7:
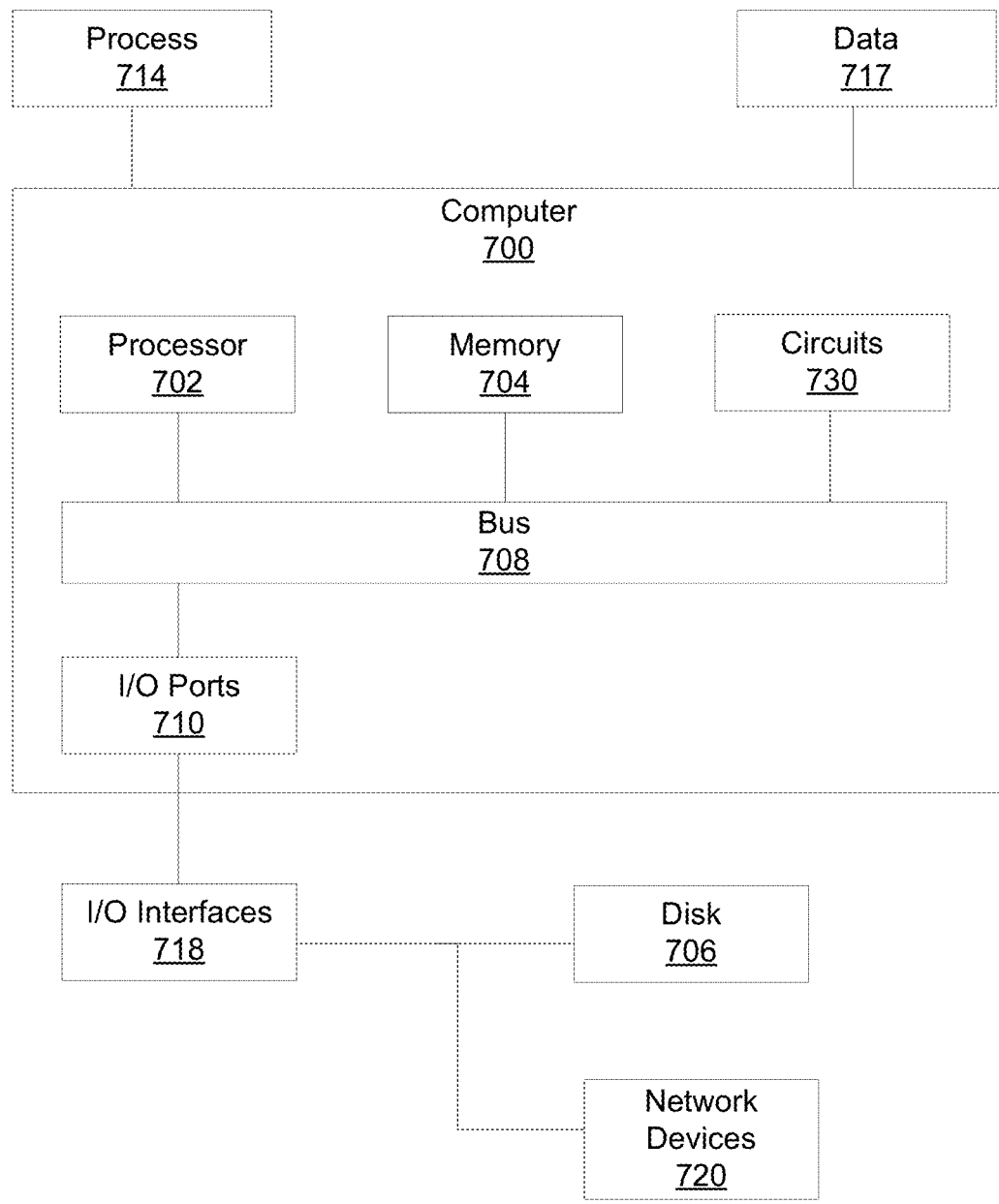
FIG. 7 illustrates an example computer in which embodiments described herein may operate.

FIG. 7 illustrates an example computer 700 in which example methods illustrated herein can operate and in which example methods, apparatus, circuits, operations, or logics may be implemented. In different examples, computer 700 may be part of a personalized medicine system, an early-stage NSCLC recurrence prediction system, an MRI system, a digital whole slide scanner, a CT system, may be operably connectable to an early-stage NSCLC recurrence prediction system, a CT system, an MRI system, a personalized medicine system, or a digital whole slide scanner, or may be part of a CADx system.

Computer 700 includes a processor 702, a memory 704, and input/output (I/O) ports 710 operably connected by a bus 708. In one example, computer 700 may include a set of logics or circuits 730 that perform a method of predicting early-stage NSCLC recurrence in digitized H&E stained images using a machine learning classifier. Thus, the set of circuits 730, whether implemented in computer 700 as hardware, firmware, software, and/or a combination thereof may provide means (e.g., hardware, firmware, circuits) for predicting NSCLC recurrence, or characterizing a region of tissue as likely or unlikely to experience NSCLC recurrence. In different examples, the set of circuits 730 may be permanently and/or removably attached to computer 700.

Processor 702 can be a variety of various processors including dual microprocessor and other multi-processor architectures. Processor 702 may be configured to perform steps of methods claimed and described herein. Memory 704 can include volatile memory and/or non-volatile memory. A disk 706 may be operably connected to computer 700 via, for example, an input/output interface (e.g., card, device) 718 and an input/output port 710. Disk 706 may include, but is not limited to, devices like a magnetic disk drive, a tape drive, a Zip drive, a flash memory card, or a memory stick. Furthermore, disk 706 may include optical drives like a CD-ROM or a digital video ROM drive (DVD ROM). Memory 704 can store processes 714 or data 717, for example. Data 717 may, in one embodiment, include digitized images of a region of lung tissue demonstrating early-stage NSCLC. Disk 706 or memory 704 can store an operating system that controls and allocates resources of computer 700.

Bus 708 can be a single internal bus interconnect architecture or other bus or mesh architectures. While a single bus is illustrated, it is to be appreciated that computer 700 may communicate with various devices, circuits, logics, and peripherals using other buses that are not illustrated (e.g., PCIE, SATA, Infiniband, 794, USB, Ethernet).

Computer 700 may interact with input/output devices via I/O interfaces 718 and input/output ports 710. Input/output devices can include, but are not limited to, CT systems, MRI systems, digital whole slide scanners, an optical microscope, a keyboard, a microphone, a pointing and selection device, cameras, video cards, displays, disk 706, network devices 720, or other devices. Input/output ports 710 can include but are not limited to, serial ports, parallel ports, or USB ports.

Computer 700 may operate in a network environment and thus may be connected to network devices 720 via I/O interfaces 718 or I/O ports 710. Through the network devices 720, computer 700 may interact with a network. Through the network, computer 700 may be logically connected to remote computers. The networks with which computer 700 may interact include, but are not limited to, a local area network (LAN), a wide area network (WAN), or other networks, including the cloud.

Figure 8:
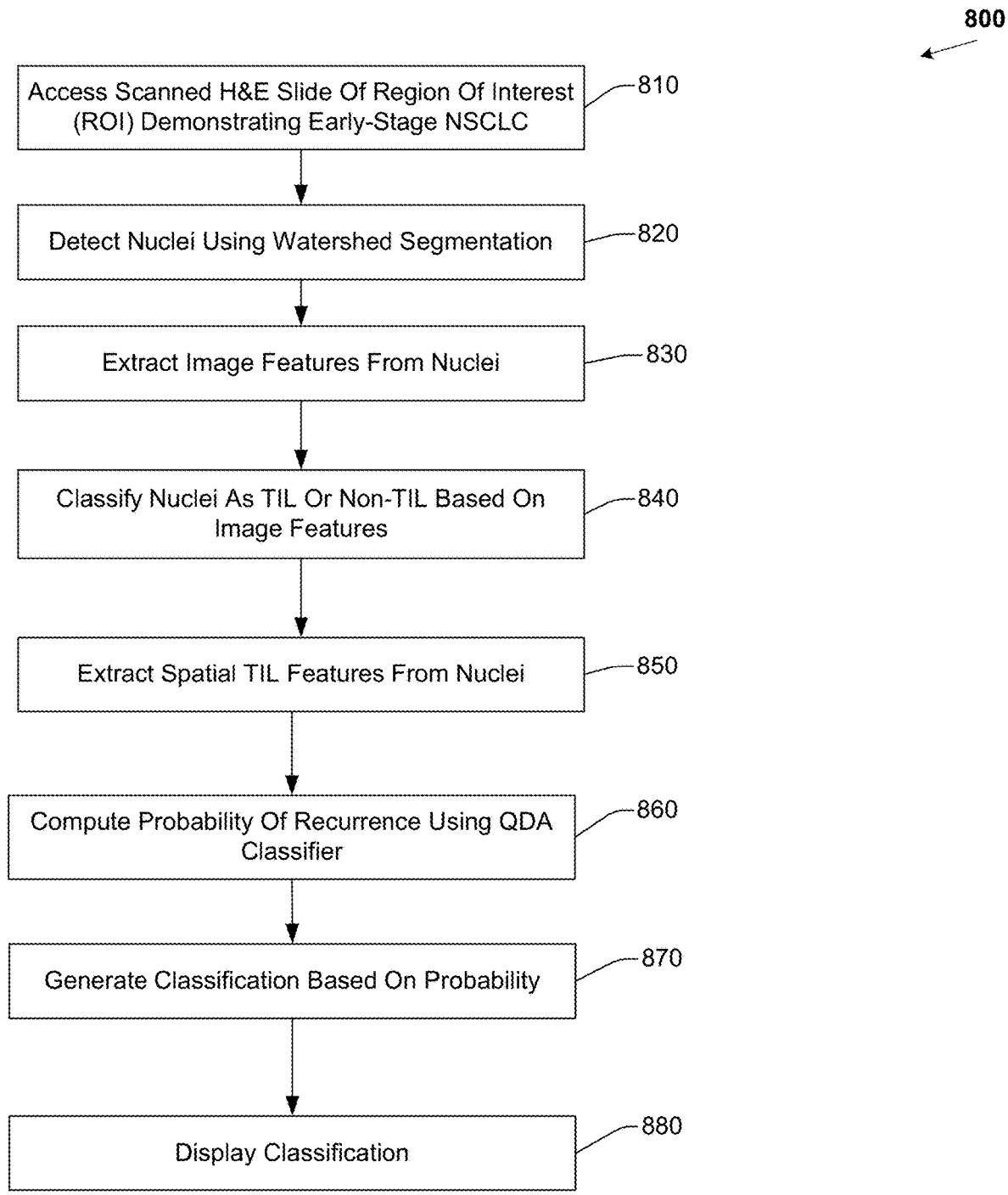
FIG. 8 illustrates an example method for predicting recurrence of early-stage NSCLC.

FIG. 8 illustrates an example method 800 for predicting early-stage NSCLC recurrence. Method 800 includes, at 810, accessing a scanned image of an H&E stained slide of a region of tissue demonstrating early stage NSCLC. The region of tissue includes a plurality of cellular nuclei. The scanned image is acquired using a first set of imaging parameters. The first set of imaging parameters may include, for example, an image size, a resolution, a scanning magnification, or other parameter. The scanned image includes a plurality of pixels, a pixel having an intensity. Accessing the scanned image includes acquiring electronic data, reading from a computer file, receiving a computer file, reading from a computer memory, or other computerized activity.

Method 800 also includes, at 820, detecting, using a watershed segmentation technique, a member of the plurality of cellular nuclei represented in the scanned image. In another embodiment, other automated segmentation or cellular nuclei detection techniques.

Method 800 also includes, at 830, extracting a set of image features from the member of the plurality of cellular nuclei. The set of image features may include a shape feature, a texture feature, or a color feature.

Method 800 also includes, at 840, classifying the member of the plurality of cellular nuclei as a TIL nucleus or non-TIL nucleus. The classification is based, at least in part, on the set of image features. In one embodiment, classifying the member of the plurality of cellular nuclei as a TIL nucleus or non-TIL nucleus include providing the set of image features to a machine learning classifier that classifies the member of the plurality of cellular nuclei based, at least in part, on the set of image features.

Method 800 also includes, at 850, extracting a set of spatial TIL features from the plurality of cellular nuclei. The set of spatial TIL features includes a first subset of features based on the spatial arrangement of TIL nuclei represented in the scanned image, and a second subset of features based on the spatial relationship between TIL nuclei and non-TIL nuclei represented in the scanned image. The set of spatial features may be based on cluster graphs, where a node of a cluster graph is a TIL nucleus centroid, or a non-TIL nucleus centroid.

Method 800 also includes, at 860, computing, using a QDA classifier, a probability that the region of tissue will experience recurrence. The QDA classifier computes the probability based, at least in part, on the set of spatial TIL features. The QDA classifier is trained on a training data set of scanned images of H&E stained slides of a region of tissue demonstrating early stage NSCLC. At least one member of the training data set is acquired using a second, different set of imaging parameters.

Method 800 also includes, at 870, generating a classification of the region of tissue as likely to experience recurrence or unlikely to experience recurrence. The classification is generated based, at least in part, on the probability.

Method 800 further includes, at 880, displaying the classification and at least one of the probability, the scanned image, or the set of spatial TIL features. Displaying the classification and at least one of the probability, the scanned image, or the set of spatial TIL features includes acquiring electronic data, reading from a computer file, receiving a computer file, reading from a computer memory, or other computerized activity.

Figure 9:
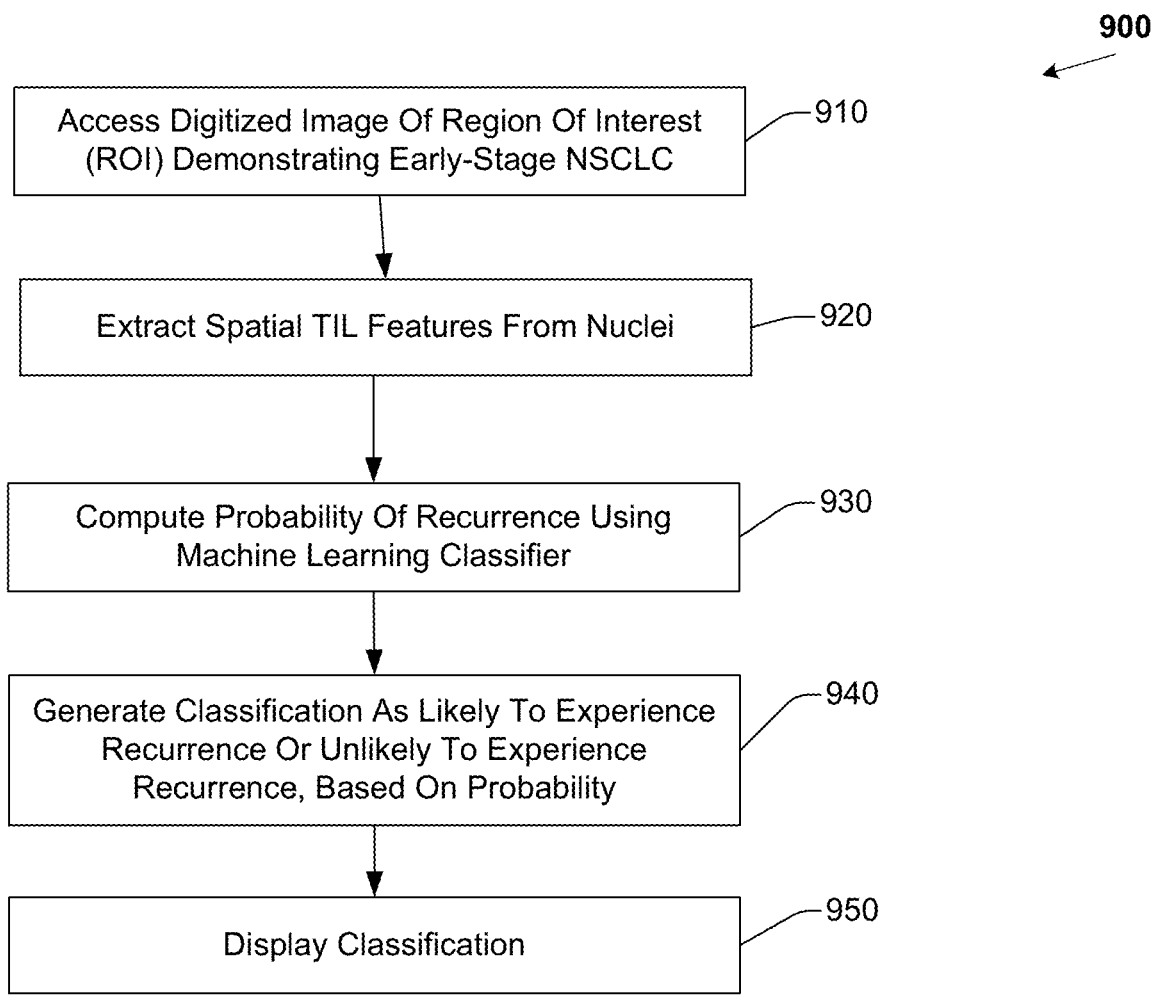
FIG. 9 is a flow diagram of example operations for predicting recurrence of early-stage NSCLC.

FIG. 9 is a flow diagram of example operations 900 that may be performed by a processor for predicting early-stage NSCLC recurrence. The set of operations 900 includes, at 910, accessing a digitized image of a region of interest demonstrating early-stage NSCLC. The region of tissue includes a plurality of cellular nuclei. Accessing the image includes acquiring electronic data, reading from a computer file, receiving a computer file, reading from a computer memory, or other computerized activity. The digitized image has a plurality of pixels, a pixel having an intensity. In one embodiment, the digitized image is a 1500 pixel by 1500 pixel digitized H&E stained image scanned at 20× magnification. In another embodiment, the digitized image may be acquired using other, different imaging parameters, including different sizes, staining techniques, or scanning magnification levels. The region of tissue includes a plurality of cellular nuclei. The plurality of cellular nuclei includes at least one TIL nucleus and at least one non-TIL nucleus.

The set of operations 900 also includes, at 920, extracting a set of spatial TIL features from the plurality of cellular nuclei. The set of spatial TIL features includes a first subset of features based on the spatial arrangement of clusters of TIL nuclei represented in the digitized image. The set of spatial TIL features also includes a second subset of features based on the spatial relationship between clusters of TIL nuclei and clusters of non-TIL nuclei represented in the digitized image.

The set of operations 900 also includes, at 930 computing a probability that the region of tissue will experience recurrence based, at least in part, on the set of spatial TIL features. The probability may be computed using a machine learning classifier, including a QDA classifier, or other type of machine learning or deep learning classifier. The machine learning classifier computes the probability based, at least in part, on the set of spatial TIL features. In one embodiment, the set of spatial TIL features includes ten features extracted from a cluster graph of non-TIL nuclei represented in the digitized image, and from a cluster graph of TIL nuclei represented in the digitized image.

The set of operations 900 also includes, at 940, generating a classification of the region of tissue as likely to experience recurrence or unlikely to experience recurrence. The classification is generated based, at least in part, on the probability. In another embodiment, the classification is generated based, at least in part, on the probability, and at least one of the digitized image or the set of spatial TIL features.

The set of operations 900 further includes, at 950, displaying the classification and at least one of the probability, the digitized image, or the set of spatial TIL features.

Examples herein can include subject matter such as an apparatus, a personalized medicine system, a CADx system, a processor, a system, circuitry, a method, means for performing acts, steps, or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for classifying a region of tissue demonstrating NSCLC, according to embodiments and examples described.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a device that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage device may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Circuit", as used herein, includes but is not limited to hardware, firmware, software in execution on a machine, or combinations of each to perform a function(s) or an action(s), or to cause a function or action from another logic, method, or system. A circuit may include a software controlled microprocessor, a discrete logic (e.g., ASIC), an analog circuit, a digital circuit, a programmed logic device, a memory device containing instructions, and other physical devices. A circuit may include one or more gates, combinations of gates, or other circuit components. Where multiple logical circuits are described, it may be possible to incorporate the multiple logical circuits into one physical circuit. Similarly, where a single logical circuit is described, it may be possible to distribute that single logical circuit between multiple physical circuits.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable storage device storing computer-executable instructions that when executed control a non-small cell lung cancer (NSCLC) recurrence prediction system to perform operations, the operations comprising:
    accessing a digitized image of a region of tissue demonstrating early-stage NSCLC, where the region of tissue includes a plurality of cellular nuclei;
    detecting a member of the plurality of cellular nuclei represented in the image;
    classifying the member of the plurality of cellular nuclei as a tumor infiltrating lymphocyte (TIL) nucleus or non-TIL nucleus;
    extracting a set of spatial TIL features from the plurality of cellular nuclei, where the set of spatial TIL features includes a first subset of features based on the spatial arrangement of TIL nuclei represented in the image, and a second subset of features based on the spatial relationship between TIL nuclei and non-TIL nuclei represented in the image;
    providing the set of spatial TIL features to a machine learning classifier;
    receiving, from the machine learning classifier, a probability that the region of tissue will experience recurrence, where the machine learning classifier computes the probability based, at least in part, on the set of spatial TIL features;
    classifying the region of tissue as likely to experience recurrence or unlikely to experience recurrence based, at least in part, on the probability; and
    generating the first subset of features, where generating the first subset of features includes:
        generating a TIL cluster graph, where a node of the TIL cluster graph is a centroid of a TIL-nucleus, where the probability that a first centroid of a first TIL-nucleus will be connected with a second, different centroid of a second, different TIL nucleus is based on a weighted Euclidean norm of the Euclidean distance between the first centroid and the second centroid; and
        computing a first set of spatial TIL features based on the TIL cluster graph.

2. The non-transitory computer-readable storage device of claim 1, where the first set of spatial TIL features includes:
    the mean of the number of TILs in the TIL cluster graph, the mean of the ratio of the area of the TIL cluster graph and the area of the region of tissue represented in the image, and the mean of the ratio of the number of TILs within the TIL cluster graph and the area of the TIL cluster graph;
    the mode of the number of TILs in the TIL cluster graph, the mode of the ratio of the area of the TIL cluster graph and the area of the region of tissue represented in the image, and the mode of the ratio of the number of TILs within the TIL cluster graph and the area of the TIL cluster graph; and
    the median of the number of TILs in the TIL cluster graph, the median of the ratio of the area of the TIL cluster graph and the area of the region of tissue represented in the image, and the median of the ratio of the number of TILs within the TIL cluster graph and the area of the TIL cluster graph.

3. The non-transitory computer-readable storage device of claim 1, the operations further comprising:
    generating the second subset of features, where generating the second subset of features includes:
        generating a non-TIL cluster graph where a node of the non-TIL cluster graph is a centroid of a non-TIL-nucleus, where the probability that a first centroid of a first non-TIL nucleus will be connected with a second, different centroid of a second, different non-TIL nucleus is based on a weighted Euclidean norm of the Euclidean distance between the first non-TIL centroid and the second, different non-TIL centroid; and
        computing a second set of spatial TIL features based on the non-TIL cluster graph and the TIL cluster graph, where the second set of spatial TIL features describes a statistical relationship between the non-TIL cluster graph and the TIL cluster graph.

4. The non-transitory computer-readable storage device of claim 3, where the second set of spatial TIL features includes:
    a ratio between the density of a non-TIL cluster graph and the density of the TIL cluster graph nearest the non-TIL cluster graph;
    the value of an intersecting area of a non-TIL cluster graph and a TIL cluster graph; and a value indicating if the nearest neighbor cluster graph of a TIL cluster graph is a non-TIL cluster graph or a TIL cluster graph.

5. The non-transitory computer-readable storage device of claim 1, where detecting a member of the plurality of cellular nuclei represented in the image includes detecting the member of the plurality of cellular nuclei represented in the image using a watershed segmentation technique.

6. The non-transitory computer-readable storage device of claim 5, where the watershed segmentation technique includes applying, at a plurality of scales, a fast radial symmetry transform and regional minima to the image.

7. The non-transitory computer-readable storage device of claim 1, where classifying the member of the plurality of cellular nuclei as a TIL nucleus or non-TIL nucleus comprises:
 extracting a set of image features from the member of the plurality of cellular nuclei;
 providing the set of image features to a second, different, machine learning classifier;
 receiving, from the second machine learning classifier, a classification of the member of the plurality of cellular nuclei as a TIL nucleus or non-TIL nucleus, where the second machine learning classifier classifies the member of the plurality of cellular nuclei based on the set of image features.

8. The non-transitory computer-readable storage device of claim 7, where the set of image features includes a texture feature, a shape feature, and a color feature.

9. The non-transitory computer-readable storage device of claim 1, where the image is a 1500 pixel by 1500 pixel digitized hematoxylin and eosin (H&E) stained image scanned at 20× magnification.

10. The non-transitory computer-readable storage device of claim 1, where the machine learning classifier is a quadratic discriminant analysis (QDA) classifier.

11. The non-transitory computer-readable storage device of claim 10, where the QDA classifier is trained on a set of training images, where a member of the set of training images is acquired using different imaging parameters than the digitized image.

12. The non-transitory computer-readable storage device of claim 1, the operations further comprising displaying the classification and at least one of the digitized image, the probability, the first subset of features, or the second subset of features.

13. An apparatus for predicting recurrence of early-stage non-small cell lung cancer (NSCLC), comprising:
 a processor;
 a memory configured to store a digitized image of a hematoxylin and eosin (H&E) stained image of a region of tissue demonstrating early stage NSCLC;
 an input/output (I/O) interface;
 a set of circuits; and
 an interface that connects the processor, the memory, the I/O interface, and the set of circuits, the set of circuits comprising:
  an image acquisition circuit configured to access a diagnostic image of a region of tissue demonstrating early-stage NSCLC, where the region of tissue includes a plurality of cellular nuclei;
  a nuclei detecting and segmentation circuit configured to:
   detect a member of the plurality of cellular nuclei represented in the diagnostic image; and
   classify the member of the plurality of cellular nuclei as a tumor infiltrating lymphocyte (TIL) nucleus or non-TIL nucleus;
  a spatial TIL feature circuit configured to:
   extract a set of spatial TIL features from the plurality of cellular nuclei represented in the diagnostic image, where the set of spatial TIL features includes a first subset of features based on the spatial arrangement of TIL nuclei represented in the diagnostic image, and a second subset of features based on the spatial relationship between TIL nuclei and non-TIL nuclei represented in the diagnostic image; and
  an NSCLC recurrence classification circuit configured to:
   compute a probability that region of tissue will experience recurrence, based, at least in part, on the set of spatial TIL features; and
   generate a classification of the region of tissue as likely to experience recurrence or unlikely to experience recurrence based, at least in part, on the probability,
  where the spatial TIL feature circuit is further configured to generate the second subset of features by:
   generating a non-TIL cluster graph, where a node of the non-TIL cluster graph is a centroid of a non-TIL nucleus, where the probability that a first centroid of a first, non-TIL nucleus will be connected with a second, different centroid of a second, different non-TIL nucleus is based on a weighted Euclidean norm of the Euclidean distance between the first centroid of the first non-TIL nucleus and the second centroid of the second, different non-TIL nucleus; and
   computing a second set of spatial TIL features based on the non-TIL cluster graph and the TIL cluster graph, where the second set of spatial TIL features describes a statistical relationship between the non-TIL cluster graph and the TIL cluster graph.

14. The apparatus of claim 13, where the nuclei detecting and segmentation circuit is configured to detect the member of the plurality of cellular nuclei represented in the diagnostic image using a watershed segmentation technique, where the watershed segmentation technique includes applying, at a plurality of scales, a fast radial symmetry transform and regional minima to the diagnostic image.

15. The apparatus of claim 13, where the spatial TIL feature circuit is further configured to generate the first subset of features by:
 generating a TIL cluster graph, where a node of the TIL cluster graph is a centroid of a TIL-nucleus, where the probability that a first centroid of a first TIL-nucleus will be connected with a second, different centroid of a second, different TIL-nucleus is based on a weighted Euclidean norm of the Euclidean distance between the first centroid of the first TIL-nucleus and the second centroid of the second, different TIL-nucleus; and
 computing a first set of spatial TIL features based on the TIL cluster graph.

16. The apparatus of claim 13, where the NSCLC recurrence classification circuit is configured to compute the probability that the region of tissue will experience recurrence using a quadratic discriminant analysis (QDA) classifier trained on a set of training images, where a member of the set of training images is acquired using different imaging parameters than the diagnostic image.

17. The apparatus of claim 13, the set of circuits further comprising a display circuit configured to display the classification and at least one of the probability, the diagnostic image, or the set of spatial TIL features.

* * * * *

UNITED STATES PATENT AND TRADEMARK OFFICE
CERTIFICATE OF CORRECTION

| | |
|---|---|
| PATENT NO. | : 10,956,795 B2 |
| APPLICATION NO. | : 16/111542 |
| DATED | : March 23, 2021 |
| INVENTOR(S) | : Anant Madabhushi et al. |

Page 1 of 1

It is certified that error appears in the above-identified patent and that said Letters Patent is hereby corrected as shown below:

In the Specification

Column 1, Lines 16 through 23; please replace "This invention was made with government support under grants 1U24CA199374-01, R01 CA202752-01A1, R01 CA208236-01A1, R01 CA216579-01A1, R01 CA220581-01A1, and 1 C06 RR012463-01 awarded by the National Institutes of Health. Also, with government support under grants W81XWH-13-1-0418, W81XWH-14-1-0323, and W81XWH-16-1-0329 awarded by the Department of Defense. The government has certain rights in the invention." with --This invention was made with government support under grants CA199374, RR012463, CA202752, CA208236, CA216579, and CA220581 awarded by the National Institutes of Health; and grants W81XWH-13-1-0418, W81XWH-14-1-0323, and W81XWH-16-1-0329 awarded by the Department of Defense. The government has certain rights in the invention.--

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*